(12) United States Patent
Lin et al.

(10) Patent No.: US 11,223,088 B2
(45) Date of Patent: *Jan. 11, 2022

(54) LOW-TEMPERATURE CERAMIC-POLYMER NANOCOMPOSITE SOLID STATE ELECTROLYTE

(71) Applicant: Bioenno Tech LLC, Santa Ana, CA (US)

(72) Inventors: Zhigang Lin, Santa Ana, CA (US); Chunhu Tan, Santa Ana, CA (US); Tianyu Meng, Santa Ana, CA (US); Shuyi Chen, Santa Ana, CA (US); Kevin Zanjani, Santa Ana, CA (US)

(73) Assignee: BIOENNO TECH LLC, Santa Ana, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 16/595,128

(22) Filed: Oct. 7, 2019

(65) Prior Publication Data

US 2021/0102063 A1    Apr. 8, 2021

(51) Int. Cl.
*H01M 50/446* (2021.01)
*H01M 6/18* (2006.01)
(Continued)

(52) U.S. Cl.
CPC .......... *H01M 50/446* (2021.01); *C08J 5/18* (2013.01); *H01M 6/181* (2013.01); *H01M 6/185* (2013.01); *H01M 10/052* (2013.01); *H01M 10/056* (2013.01); *C08J 2371/02* (2013.01); *C08K 3/105* (2018.01); *C08K 5/0016* (2013.01); *C08K 2003/221* (2013.01); *C08K 2003/2227* (2013.01); *C08K 2003/2244* (2013.01); *C08K 2201/011* (2013.01); *C08L 71/02* (2013.01);
(Continued)

(58) Field of Classification Search
CPC .................................................. H01M 50/446
See application file for complete search history.

(56) References Cited

U.S. PATENT DOCUMENTS

| 5,728,489 A | 3/1998 | Gao |
| 5,834,136 A | 11/1998 | Gao |

(Continued)

*Primary Examiner* — Jeremiah R Smith
(74) *Attorney, Agent, or Firm* — Charles H Jew

(57) ABSTRACT

Ceramic-polymer film includes a polymer matrix, plasticizers, a lithium salt, and a ceramic nanoparticle, LLZO: $Al_xLi_{7-x}La_3Zr_{1.75}Ta_{0.25}O_{12}$ where x ranges from 0 to 0.85. The nanoparticles have diameters that range from 20 to 2000 nm and the film has an ionic conductivity of greater than $1\times10^{-4}$ S/cm ($-20°$ C. to $10°$ C.) and larger than $1\times10^{-3}$ S/cm ($\geq 20°$ C.). Using a combination of selected plasticizers to tune the ionic transport temperature dependence enables the battery based on the ceramic-polymer film to be operable in a wide temperature window ($-40°$ C. to $90°$ C.). Large size nanocomposite film (area $\geq 8$ cm$\times 6$ cm) can be formed on a substrate and the concentration of LLZO nanoparticles decreases in the direction of the substrate to form a concentration gradient over the thickness of the film. This large size film can be employed as a non-flammable, solid-state electrolyte for lithium electrochemical pouch cell and further assembled into battery packs.

32 Claims, 9 Drawing Sheets

(51) Int. Cl.
  *H01M 10/052* (2010.01)
  *H01M 10/056* (2010.01)
  *C08J 5/18* (2006.01)
  *C08L 71/02* (2006.01)
  *C08K 3/105* (2018.01)
  *C08K 3/22* (2006.01)
  *C08K 5/00* (2006.01)

(52) U.S. Cl.
  CPC .............. *H01M 2300/0071* (2013.01); *H01M 2300/0082* (2013.01); *H01M 2300/0091* (2013.01)

(56) References Cited

U.S. PATENT DOCUMENTS

| | | | |
|---|---|---|---|
| 5,964,903 A | 10/1999 | Gao | |
| 6,020,087 A | 2/2000 | Gao | |
| 6,156,458 A | 12/2000 | Brodd | |
| 6,159,638 A * | 12/2000 | Takatera | H01M 10/0565 429/309 |
| 6,596,440 B2 | 7/2003 | Gavelin | |
| 6,905,762 B1 | 6/2005 | Jow | |
| 7,166,366 B2 | 1/2007 | Moser | |
| 8,198,783 B2 | 6/2012 | Bayer | |
| 9,548,514 B2 | 1/2017 | Kyu | |
| 9,819,053 B1 | 11/2017 | Zimmerman | |
| 2002/0028387 A1* | 3/2002 | Gavelin | H01M 10/0525 429/303 |
| 2005/0287441 A1 | 12/2005 | Passerini | |
| 2006/0216608 A1* | 9/2006 | Ohata | H01M 4/13 429/246 |
| 2011/0053002 A1* | 3/2011 | Yamamura | C04B 35/486 429/322 |
| 2014/0255772 A1* | 9/2014 | Kyu | H01M 10/052 429/189 |
| 2016/0268630 A1* | 9/2016 | Tsukada | H01M 10/0525 |
| 2018/0034025 A1* | 2/2018 | Lee | H01M 10/0525 |
| 2019/0088998 A1* | 3/2019 | Schuh | C08J 5/22 |
| 2019/0341597 A1* | 11/2019 | Tempel | H01M 50/46 |
| 2020/0144665 A1* | 5/2020 | Huang | C08F 22/22 |
| 2020/0280093 A1* | 9/2020 | Sakamoto | H01M 4/525 |
| 2020/0335814 A1* | 10/2020 | Lin | H01M 4/382 |
| 2020/0373565 A1* | 11/2020 | Yawata | C01B 25/00 |

* cited by examiner

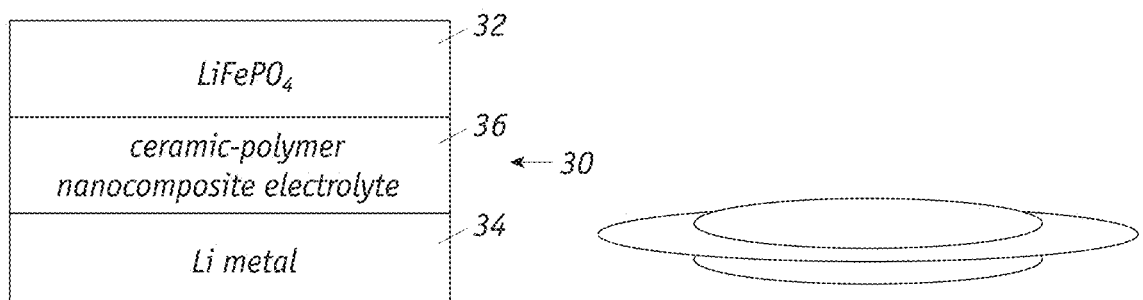
FIG. 2A
FIG. 2B
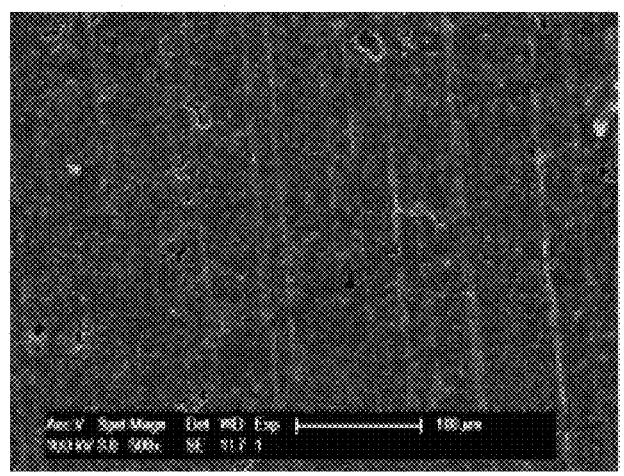
FIG. 2C
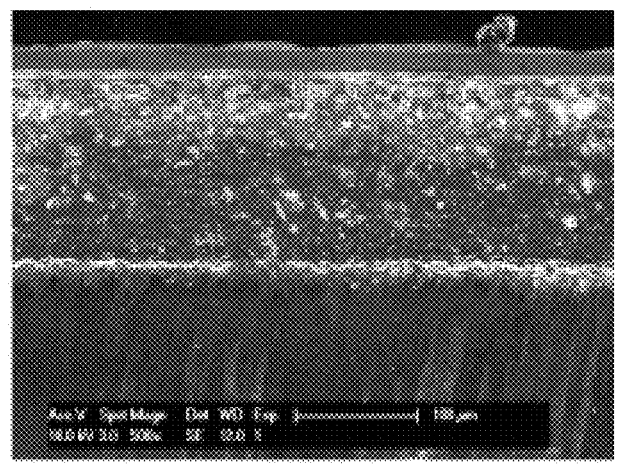
FIG. 2D

LOW-TEMPERATURE CERAMIC-POLYMER NANOCOMPOSITE SOLID STATE ELECTROLYTE

The invention was made with Government support under SBIR Grant No. N6833518C0685 awarded by the U.S. Navy to Bioenno Tech LLC. The Government has certain rights to the invention.

FIELD OF THE INVENTION

The present invention generally relates to electrochemical devices and, more particularly, to polymer gel electrolytes that exhibit superior ionic conductivities at low temperatures (typically from 0° C. to −40° C.) and which are particularly suited for Li-ion electrochemical cells and batteries.

BACKGROUND OF THE INVENTION

Non-aqueous lithium electrochemical cells typically include an anode, a lithium electrolyte prepared from a lithium salt dissolved in one or more organic solvents, and a cathode of an electrochemically active material. Organic solvents are typically added for solvating the lithium salt which provides mobile ions. During the electrochemical discharge process lithium ions are transported through the electrolyte from the anode to the cathode. As lithium ions are taken up by the cathode, there is a simultaneous release of electrical energy.

Solid-state electrolytes can replace conventional organic liquid electrolytes, which are generally flammable and toxic. Conventional electrode materials and lithium metal anodes can be employed with solid-state electrolytes. Lithium anodes have high inherent high capacities (C) which increase the cell voltage (V) and thereby improves the energy density of the battery (E=VC). There are two critical challenges to achieving high performance batteries using solid-state electrolytes: (1) low ionic conductivities of many solid-state electrolytes, and (2) the low mechanical strengths of electrolyte materials do not adequately prevent Li dendrite growth. Solid-state electrolytes which are being explored are typically inorganic-based (depending on the lattice structure, they are garnet, perovskite, glass-ceramics etc.) and polymer-based. Solid polymer electrolytes can be manufactured by relatively simple, inexpensive techniques whereas fabricating solid inorganic electrolytes with well-defined compositions or lattice structures requires high temperature processes. Due to the high degree of coordination between Li ions and the polymer chain in sold-state polymer electrolytes, the chain-assisted Li ion transport mechanism is less robust at room temperature or below the melting temperature of the polymer. The attendant poor ionic conductivity is attributed to inhibitions to Li ion transport. The addition of plasticizers to the solid polymer electrolyte improves the polymer chain mobility at room temperature which results in an increase in the ionic conductivity but the plasticizers also reduce the mechanical strength of the solid-state polymer electrolyte.

With solid polymer electrolytes, lithium dendrites, which develop as an electrochemical cell undergoes charging and discharging cycles, can penetrate through the 'plasticizer-softened' polymer electrolytes to short the cell. Incorporating ceramic nanoparticles to enhance the mechanical strengths of polymer electrolytes can suppress Li dendrite growth, which significantly improves the cycling stability of batteries based on ceramic-polymer solid electrolytes. Moreover, nano-sized ceramic particles have excellent miscibility with the polymer materials and the particles afford ionic transport channels which facilitate ion transport within the ceramic-polymer solid electrolyte layer. Unfortunately, the ion transport properties of current ceramic-polymer solid electrolytes degrade at low temperatures. Batteries made with such electrolytes are generally not suited for cold zone applications.

SUMMARY OF THE INVENTION

The present invention is based in part on the development of a ceramic-polymer nanocomposite solid-state electrolyte composition in which ionic conductive ceramic nanoparticles are embedded in an amorphous polymer matrix that contains plasticizers. The ceramic phase is an oxide with the formula: $Al_xLi_{7-x}La_3Zr_{1.75}Ta_{0.25}O_{12}$ where x ranges from 0 to 0.85 (refer to as LLZO) which is chemically stable and conductive.

In one aspect, the invention is directed to ceramic-polymer film that includes: a polymer matrix; a plasticizer; a lithium salt; and ceramic nanoparticles having the formula $Al_xLi_{7-x}La_3Zr_{1.75}Ta_{0.25}O_{12}$ where x ranges from 0 to 0.85 (LLZO), wherein the ceramic nanoparticles have diameters that range from 20 to 2000 nm, wherein the film has an ionic conductivity of higher than $1\times10^{-4}$ S/cm when measured at a temperature in the range of −20° C. to 10° C. and wherein the film has an ionic conductivity of higher than $1\times10^{-3}$ S/cm when measured at a temperature of 20° C. or higher.

In another aspect, the invention is directed to an electrochemical cell which includes: an anode; a cathode; and interposed therebetween a solid-electrolyte which includes: a polymeric matrix; a plasticizer; a lithium salt; and ceramic nanoparticles having the formula $Al_xLi_{7-x}La_3Zr_{1.75}Ta_{0.25}O_{12}$ where x ranges from 0 to 0.85 (LLZO), and wherein the ceramic nanoparticles have diameters that range from 20 to 2000 nm.

In yet another aspect, the invention is directed to a process for preparing an electrochemical cell which includes:
(a) providing a cathode;
(b) providing an anode; and
(c) forming a sold electrolyte between the cathode and anode wherein the solid electrolyte includes: (i) a polymeric matrix, (ii) a plasticizer, (iii) a lithium salt; and (iv) ceramic nanoparticles having the formula $Al_xLi_{7-x}La_3Zr_{1.75}Ta_{0.25}O_{12}$ where x ranges from 0 to 0.85 (LLZO), and wherein the ceramic nanoparticles have diameters that range from 20 to 2000 nm.

The plasticizer comprises dimethyl sulfoxide (DMSO), succinonitrile (SCN), glutaronitrile (GN), ethylene carbonate (EC), propylene carbonate (PC) and mixtures thereof. In preferred embodiments, the solid electrolyte contains essentially a single plasticizer that is selected from one of the above plasticizers, and particularly EC In another preferred embodiment, the solid electrolyte contains a binary plasticizer consisting essentially of (i) EC and DMSO or (ii) PC and DMSO. The use of these lower melting point plasticizers improves the ionic conductivities of the solid-state electrolytes at lower temperatures. In contrast, the use of a plasticizer or mixture of plasticizers that has a high melting temperature of above 40° C. limits ionic conductivity of the solid-state ceramic-polymer electrolyte.

The solid-state electrolyte is a hybrid, ceramic-polymer nanocomposite material that exhibits high ionic conductivity over a wide temperature window (−40° C. to 90° C.) and excellent chemical/electrochemical stability with respect to the electrodes. The electrolyte material is a polymer-plasticizer-lithium salt-inorganic filler mixture which preferably has an amorphous structure and large dielectric constant environment that is favorable for lithium ion dissociation and polymer chain-assisted ion conduction. It can be used as an electrolyte layer or integrated or added into an electrode layer to form a composite electrode. No liquid organic solvent is required with the composite electrode.

The temperature dependence of ionic conductivity of the processed electrolytes layer can be precisely controlled to achieve the desired working temperature for their applications in batteries. The ionic conductivity at low temperatures (<0° C.) can be modified by using a combination of plasticizers having low melting temperatures. For instance, the melting point of PC is −90° C., therefore the glass transition temperature of the polymer matrix can be significantly reduced by using PC. In this fashion, the polymer chain remains 'soft' and can assist the ion transportation when the temperature is low. Electrochemical cells and batteries based on this solid electrolyte with manipulated low temperature ionic conductivity can exhibit excellent performance for applications in cold zones as well as for specific applications.

BRIEF DESCRIPTION OF THE DRAWINGS

FIG. 2A is an electrochemical cell.

FIG. 2B is a coin cell.

FIGS. 2C and 2D are cross sectional scanning electron microscopy images of a coin cell containing a LLZO-polymer gel electrolyte composite.

DETAILED DESCRIPTION OF PREFERRED EMBODIMENTS

The invention is directed to high ionic conductive solid electrolytes based on ceramic-polymer nanocomposites and the associated material processing methods. The high ionic conductivity over a wide temperature window, optimized electrolyte-electrode interface, non-flammability of the novel class of solid-state electrolyte enables their use in many battery applications from battery cells to integrated battery systems.

The solid-state electrolyte exhibits ionic conductivity of greater than $1 \times 10^{-3}$ S/cm (at room temperature of 20° C.) and has a large electrochemical window of up to 4.8V (at RT). In addition, it has a wide use temperature with a thermally stable temperature of up to 150° C. and a glass transition temperature of less than −60° C. Finally, the solid-state electrolyte shows low interfacial resistance, good compatibility with both lithium metal and cathode materials, and enhanced mechanical strength with a Young's modulus that exceeds 50 MPa.

Figure 1A:
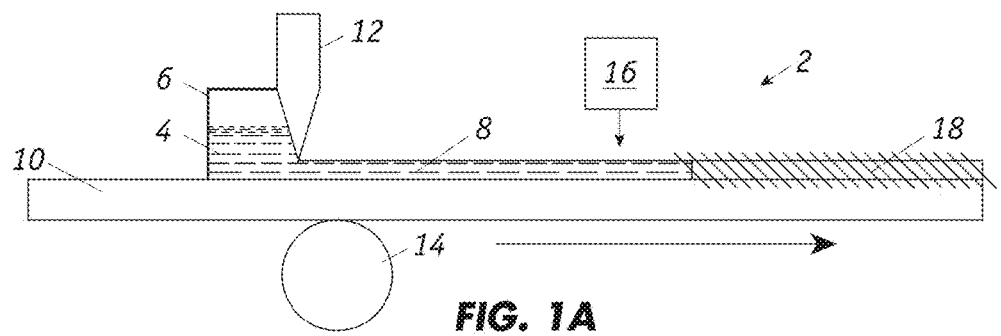
FIG. 1A is an apparatus for producing the high-ionic conductivity ceramic-polymer nanocomposite solid state electrolyte.

FIG. 1A shows a system 2 for preparing the solid electrolyte wherein a gel precursor 4 is formulated in tank 6. The gel precursor 4 comprises monomers, oligomers or partial polymers thereof (collectively referred to as polymer precursors), lithium salt, ceramic nanoparticles, and plasticizers. The materials are preferably dried under vacuum before being mixed in tank 6 which is heated at a temperature sufficient to melt the plasticizers. When the plasticizers include SCN, for instance, the tank heated to 60° C. An adjustable doctor blade 12 coats a wet film 8 of the gel precursor of the desired thickness onto a moving cathode substrate 10 which is supported by stationary roll 14. The cathode substrate 8 is also maintained at 60° C. For fabricating electrochemical cells, the wet film 8 is typically 100 to 900 µm thick. (Another technique of applying the wet film is by spraying the gel precursor.) UV radiation directed to wet film 8 from UV source 16 initiates in-situ radical polymerization to produce a layer of ceramic-polymer nanocomposite 18 which is an amorphous polymeric matrix in which the lithium salt and ceramic nanoparticles are distributed. The direct film formation on cathode is called co-sintering, which can create intimate contact between electrolyte and cathode layer.

Figure 1B:
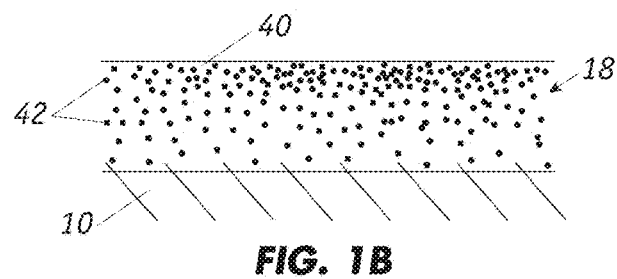
FIG. 1B depicts a gradient of LLZO nanoparticles within the ceramic-polymer nanocomposite solid-state electrolyte.

The ceramic nanoparticles within the wet film 8 of the gel precursor that is disposed on the cathode substrate 10 have different surface energies than that of the polymer precursor chain segments. Moreover, the top wet film-atmosphere interface and the lower wet film-substrate interface have different surface energies. To reduce the surface energy of the whole system, a phase separation within the ceramic-polymer nanocomposite 18 layer occurs after polymerization. It has been found that LLZO ceramic nanoparticles accumulate toward the top of the ceramic-polymer nanocomposite 18 layer, which has thickness (d), so that a ceramic nanoparticle gradient is established within the layer 18. A gradient is established along the thickness direction. For example, FIG. 1B illustrates the cathode substrate 10 which is laminated with a layer of the ceramic-polymer nanocomposite 18 in the system 2 shown in FIG. 1A. The polymeric matrix 40 is formed on substrate 110 and the ceramic nanoparticles 42 are not homogeneously distributed. The particles form a gradient in the direction of the surface so that the proportion of ceramic nanoparticles increases in the direction of the surface. This upper side of the gel electrolyte, on which the anode is disposed, has enhanced mechanical strength and the higher concentration of LLZO acts as a barrier to lithium dendrite growth.

The cathode substrate 10 which is laminated with a layer of the ceramic-polymer nanocomposite 18 is further processed by laminating an anode material onto the exposed side of the nanocomposite layer. This tri-layer composite which includes an anode, solid state electrolyte (separator) and cathode can be cut into any desired configuration to form individual electrochemical cells.

Figure 1C:
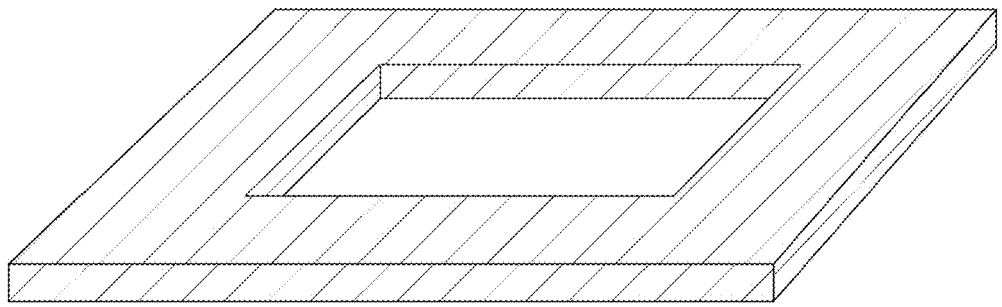
FIG. 1C is a pre-designed module for in-situ polymerization of a gel precursor.

The solid-state gel electrolyte can be processed into large size layers for pouch cell applications. For instance, a heated precursor solution 4 (FIG. 1A) can be poured into a pre-designed PVDF module which has a precisely controlled geometry as shown in FIG. 1C. The module serves as a mold and is made from a sheet of plastic wherein the aperture or opening with specific dimensions is formed. A preferred module has a rectangular aperture having (L×W×H) dimensions of 8 cm×6 cm×0.2 mm, respectively. In-situ polymerization yields a free-standing solid-state gel electrolyte layer that can be peeled off the module and transferred onto a cathode layer. Large size solid-state gel electrolytes are assembled with comparable size cathode materials and porous Li metal electrode layers, to fabricate all solid-state lithium-ion pouch cells with targeted performance of 3.6V/ 2.5 Ah that can be further assembled into battery packs of with 28V/5 Ah or 28V/25 Ah specifications.

Lithium electrochemical cells and batteries employing the large size ceramic-polymer nanocomposite electrolyte will have excellent rate performance as well as outstanding cycling stability (>500 cycles) over a wide temperature as compared to cells and batteries based on polymer solid electrolytes using only one plasticizer. In addition, they will have enhanced cycling stability, and high specific capacitance at high charge-discharge rates (1 C, 2 C, 3 C or 5 C). Batteries with the novel ceramic-polymer nanocomposite electrolyte will meet severe specifications for wide temperature working range, quick charging requirement, and high energy density.

Figure 1D:
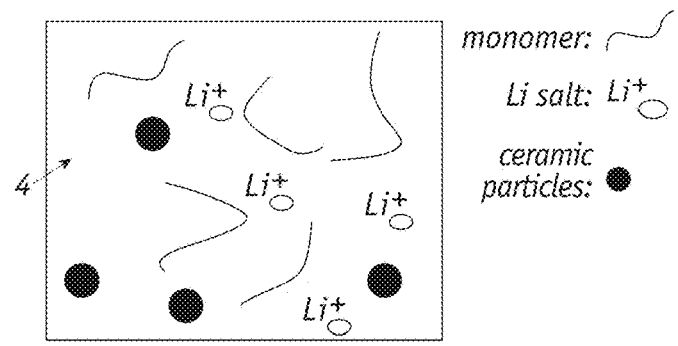
FIG. 1D depicts the composition of a gel precursor.

As depicted in FIG. 1D, the gel precursor 4 comprises polymer precursors, lithium salt, and ceramic nanoparticles that are mixed in plasticizers. The polymer precursors are monomers or reactive oligomers that have average molecular weights of 200 to 1000 daltons and can be polymerized to form polymers with average molecular weights of 10,000 to 100,000 daltons. Preferred polymer precursors include, for example, ethylene oxide, ethylene glycol diacrylate, and acrylonitrile. These polymer precursors form poly (ethylene oxide) (PEO), poly (ethylene glycol diacrylate) (PEGDA), and poly(acrylonitrile) (PAN), respectively. The polymer precursors typically comprise 10 to 50 wt % and the polymeric matrix, which is derived from the polymer precursors, typically comprises 30 to 95 wt % of the subsequent solid-state electrolyte. A preferred polymer matrix is PEGDA which is derived by in-situ UV-polymerization using phenylbis(2,4,6-trimethylbenzoyl) phosphine oxide, which is available as IRGACURE 819, as the initiator.

The lithium salt is any lithium salt that is suitable for use in a non-aqueous solid-state electrolyte. Preferred lithium salts include, for example, $LiC_2F_6NO_4S_2$ (LiTFSI), $LiClO_4$, and $LiPF_6$. The lithium salt preferably comprises 20 to 60 wt % of the gel precursor and of the solid-state electrolyte that is made therefrom. In a preferred embodiment, the lithium salt comprises a mixture of lithium salts that includes lithium bis(oxalato)borate or $LiB(C_2O_4)_2$ (LiBOB), which serves as a lithium salt enhancer, to improve ion transport within polymer electrolyte layer. Due to the low solubility or miscibility of LiBOB, only a small amount of LiBOB should be added into polymer-gel based solid-state electrolyte. When employed, the weight ratio of LiBOB to the polymer-gel electrolyte is about 0.4-0.6 wt %.

The ceramic nanoparticles are preferably $Al_xLi_{7-x}La_3Zr_{1.75}Ta_{0.25}O_{12}$ wherein x ranges from 0 to 0.85 (LLZO) and have diameters that range from 100 nm to 2000 nm. The LLZO preferably comprises 5 to 70 wt % of the gel precursor and of the solid-state electrolyte. Incorporating LLZO into a polymer gel electrolyte produces a solid-state electrolyte with enhanced structural integrity and high ionic conductivity.

The LLZO is synthesized by mixing stoichiometric amounts of starting powders including $LiOH.H_2O$, $La_2O_3$, $ZrO_2$, $Al_2O_3$ and $Ta_2O_5$ and milling the mixture via high energy ball milling in ethanol media for 8-12 hrs. Zirconia balls (average diameter of 5 mm) balls at a ball-to-powder weight ratio of about 20:1 and about 360 rpm milling speed. After milling, the collected slurry is dried (80° C., 2-3 hrs.), crushed, and sieved (through a 200 mesh), and calcined at about 900° C. for 6 hours to fully decompose LiOH. The as-calcined powders are then ball-milled again in ethanol for 6-12 hrs. Planetary ball mill was used, followed by drying process. The dried powders were pressed into pellets with diameters of about 9.5 mm at about 300 MPa, and then sintered with a temperature range from 800° C. to 1150° C. for about 4 hrs. to obtain particles with size from 100 nm to 2000 nm. Both calcination and sintering processes are carried out with samples in alumina crucibles covered by alumina lids, and the pellets are embedded in corresponding mother powder in order to mitigate losses of volatile components and accidental contamination. As is apparent, when synthesizing LLZO of the formula $Li_7La_3Zr_{1.75}Ta_{0.25}O_{12}$, that is when x is 0, no $Al_2O_3$ is used.

A feature of the invention is that the size of LLZO nanoparticles can be tuned by controlling temperature of synthesis. The calcine temperature determines the particle sizes of LLZO. Generally, high calcined temperature and long calcined time produce larger size LLZO particles. It has been demonstrated that a calcine temperature of about: (i) 950° C., (ii) 1000° C., and (iii) 1050° C. yields LLZO nanoparticles with diameters of about 100 to 600 nm, 1000 to 1200 nm, and 1 to 2 μm, respectively.

The plasticizer is an aprotic compound that serves as a liquid medium in which the polymer precursors are polymerized to form a polymer matrix. The plasticizer comprises DMSO, SCN, GN, EC, PC, and mixtures thereof. In particular, the solid electrolyte can contain essentially a single plasticizer, particularly EC. Alternatively, the solid electrolyte can incorporate a binary plasticizer consisting essentially of (i) EC and DMSO or (ii) PC and DMSO. The plasticizer preferably comprises 10 to 60 wt % of the gel precursor and of the solid-state electrolyte made therefrom. When a mixture of EC and DMSO is used, the mixture preferably comprises 10 wt % to 70 wt % EC and 30 wt % to 90 wt % DMSO. When a mixture of PC and DMSO is used, the mixture preferably comprises 10 wt % to 70 wt % PC and 30 wt % to 90 wt % DMSO.

The ceramic-polymer nanocomposite electrolyte is particularly suited for use in electrochemical cells and batteries. An electrochemical cell refers to a composite containing an anode, a cathode and a solid-state electrolyte interposed therein. A battery refers to two or more electrochemical cells electrically interconnected to in an appropriate series/parallel arrangement to provide the required operating voltage and current levels. Electrochemical cells can be stacked into batteries of various configurations including pouch cells. Lithium ion electrochemical cells and batteries can exhibit 3.6V/2.5 Ah energy and power performance typically in the range of 2.5 to 4.8 volts with an electric charge of 2.5 to 10 amp-hour, preferred cells and batteries can operate at 3.6V with 2.5 Ah.

The anode typically comprises a compatible anodic material which is any material which functions as an anode in an electrochemical cell. Preferred anodes comprise lithium, lithium alloys or graphite.

The cathode typically comprises a compatible cathodic material which is any material which functions as a positive pole in an electrochemical cell. Preferred cathodes comprise metal oxides and lithiated compounds thereof. A preferred cathode comprises $LiFePO_4$ (LFP), $LiCoO_3$, $LiMnCoO_2$.

FIG. 2A depicts an electrochemical cell 30 that comprises an LFP cathode 32 and lithium metal anode 34 with a ceramic-polymer nanocomposite solid-state electrolyte 36 interposed in between. The anode 34 and electrolyte 36 layers define a first interface where the lithium metal and electrolyte materials meet and form intimate contacts. Similarly, the cathode 32 and electrolyte 36 layers define a second interface where the LFP and electrolyte materials meet and form intimate contacts. The intimate contacts afford good ion transport and reduces interface resistance. The ceramic nanoparticles are not homogenously distributed within the polymeric matrix, instead, there is a gradient within the matrix whereby the concentration of ceramic nanoparticles is higher in the region adjacent the anode/electrolyte interface than at the region adjacent the cathode/electrolyte. That is, the region adjacent the first interface is ceramic nanoparticle rich composition and the region adjacent the second interface is polymer-gel rich composition. The electrochemical cell can be encapsulated to form a "coin cell" as shown in FIG. 2B. The coin cell has current collectors on the exterior surfaces of the cathode and anode. Electrochemical cells can be stacked into batteries.

FIGS. 2C and 2D are cross sectional SEM images of a coin cell containing a LLZO-polymer gel electrolyte composite. The images show good intimate contacts between the lithium anode and the electrolyte layer and between the cathode and the electrolyte layer.

Free-standing solid-state electrolytes comprising 10-50 wt % PEDGA polymer matrix, 10-60 wt % LiTFSI, 20-60 wt % plasticizer, and 5-60 wt % LLZO were fabricated. The LLZO consisted of $Al_{0.15}Li_{6.75}La_3Zr_{1.75}Ta_{0.25}O_{12}$ and the single plasticizer in each electrolyte consisted of SCN, EC, DMSO, GN, or PC. The ionic conductivities of these five solid-state electrolytes each with a different plasticizer were measured over a temperature window of $-40°$ C. to $90°$ C. These plasticizers have different effects on the ionic conductivity in the high temperature ($\geq 30°$ C.) and low temperature ($\leq 0°$ C.) regions.

Figure 3:
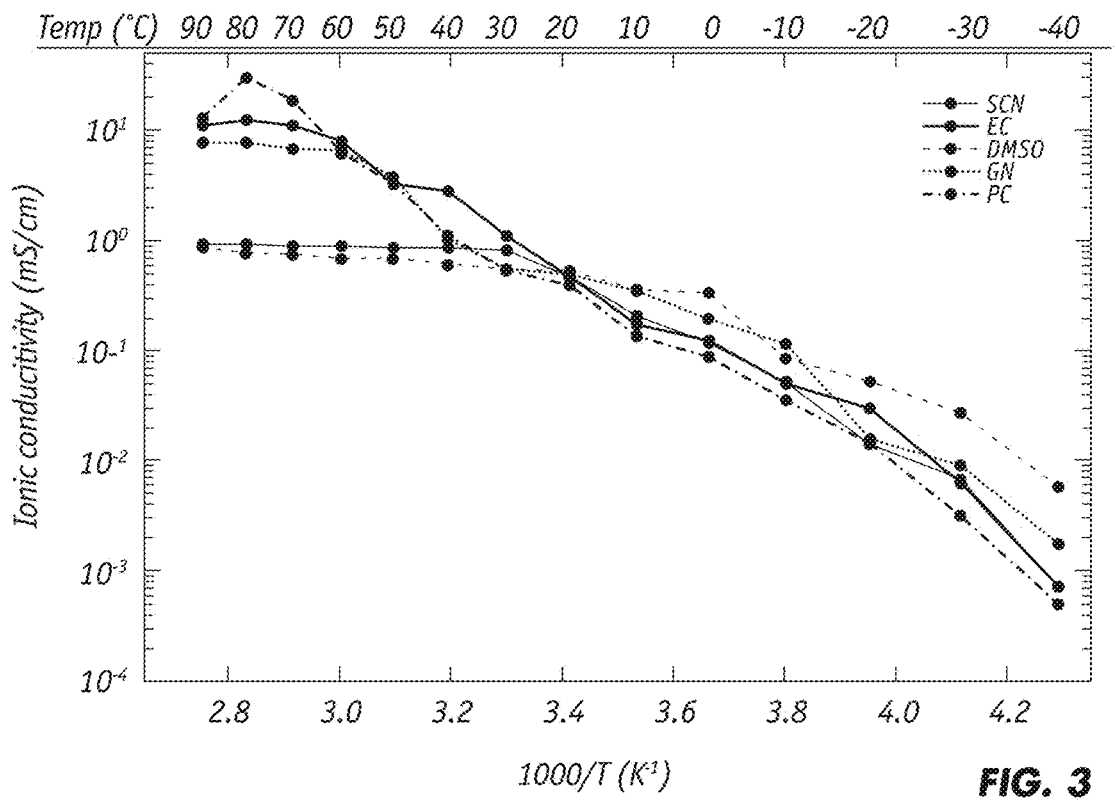
FIG. 3 is a graph of ionic conductivity vs. temperature for LLZO-polymer gel electrolytes containing different plasticizers.

As shown in FIG. 3, at the room temperature ($20°$ C.), all of the LLZO-polymer gel electrolytes exhibited similar ionic conductivities which are within about 1 mS/cm of each other. The SCN (melting point of $52°$ C. to $62°$ C.) based LLZO-polymer gel electrolyte exhibited low ionic conductivities at both low and high temperature ranges. The use of a lower melting temperature plasticizers: EC (MP of $34°$ C. to $37°$ C.), GN (MP $-29.6°$ C.), and PC (MP $-48.8°$ C.), improved the ionic conductivities significantly in the high temperature region. This phenomenon could be attributed to the operations of a chain-assisted ion transport mechanism as these plasticizers further reduce the glass transition temperature of the PEGDA polymer matrix. Coin cells using SCN based LLZO-polymer gel electrolytes exhibit good rate performance as well as cycling stability for 50 cycles. It is expected that coin cells with gel electrolyte layers based on EC, GN, or PC will have even better rate performances (relative to those of cells using SCN-based gel electrolytes).

As further shown in FIG. 3, the ionic conductivity of the GN based gel electrolyte is better than that of the SCN based gel electrolytes in the whole temperature window and is particularly better at the high temperature range. That the GN molecule has the same nitrile functional groups as that of SCN, suggests that reducing the melting point of the plasticizer in the electrolyte layer improves the ionic conductivity. The ionic conductivities of the EC and PC based gel electrolytes show the same trend within the entire temperature window and with the PC based gel electrolyte exhibiting a significant improvement at about $80°$ C. EC and PC both have a carbonate functional group. Finally, FIG. 3 shows that the DMSO (MP $19°$ C.) based gel electrolyte exhibited comparable ionic conductivities to that of the SCN based electrolyte at higher temperatures but exhibited slightly better ionic conductivities at lower temperatures.

One reason for the relatively high ionic conductivities is that with a polymer to plasticizer ratio of 1:3, the solid-state electrolytes have amorphous morphologies which enhances the chain-assisted ionic transport mechanism. By decreasing the melting temperature of the plasticizer, the temperature dependence of ionic conductivity is significantly increased because plasticizers with low melting temperature tend to induce lower glass transition temperature for polymers so that the chain movement is easier at low temperatures which facilitates ion transport in low temperature regions.

Figure 4:
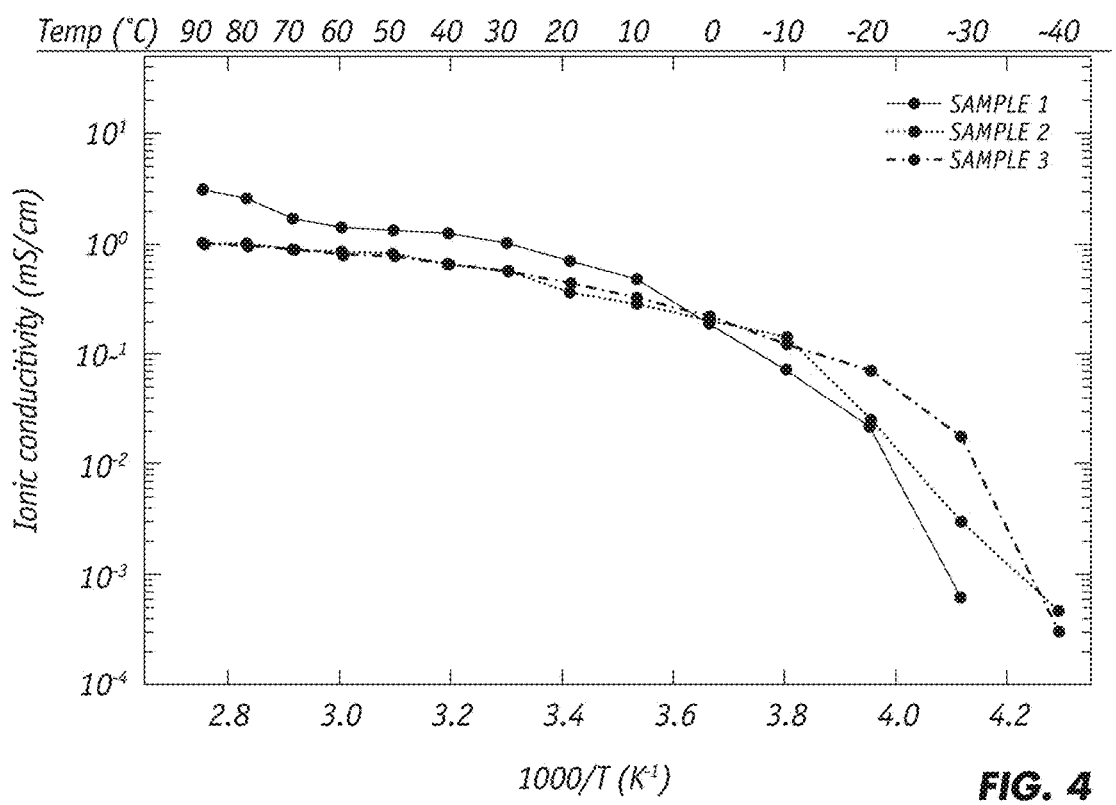
FIG. 4 is a graph of ionic conductivity vs. temperature for LLZO-polymer gel electrolytes containing different binary plasticizer mixtures of EC and DMSO.

Free-standing solid-state electrolytes comprising a binary plasticizer consisting of varying amounts of EC and DMSO but otherwise having the same composition as the single plasticizer solid-state gel electrolytes depicted in FIG. 3 were prepared. The weight ratios of EC and DMSO in samples 1, 2 and 3 were: (i) 90/10, (ii) 70/30, and (iii) 50/50, respectively. The total weight concentration of the binary plasticizers in these electrolytes was the same as in the single plasticizer electrolytes. The ionic conductivities of the three samples were measured over a wide temperature window and the results of are shown in FIG. 4. The EC and DMSO binary plasticizer-based electrolyte layers exhibited moderate ionic conductivities in the low temperature range. In the high temperature range, the ionic conductivities are higher than that of a pure DMSO based electrolytes but are much lower than that of a pure EC based electrolyte. In the low temperature range, the ionic conductivity of binary plasticizers-based electrolytes is only slightly higher than that of the pure EC based electrolyte but lower than that of the pure DMSO based electrolyte. These results suggest that these two plasticizers, that is, EC and DMSO, do not have good compatibility and the ionic conductivity of these binary plasticizers-based electrolytes do not improve in the low temperature region. The data suggests that combining different plasticizers which have the same functional group can improve the ionic conductivity of the electrolytes in the lower temperature range of from $0°$ C. to $-40°$ C. If DMSO is used, it is preferably incorporated as a single plasticizer-based gel electrolyte, that is, DMSO is used alone as the sole plasticizer to achieve improved the ionic conductivities of the electrolyte in the low temperature range of from $0°$ C. to $-40°$ C.

Li salt enhancer, lithium bis(oxalato)borate (LiBOB) can be added to the polymer-gel electrolyte to enhance ion transport within the polymer electrolyte layer. Due to the low solubility or miscibility of LiBOB, only a small percentage of LiBOB was added into polymer-gel based solid-state electrolyte and reported to improve ionic conductivities. Thus, to further improve the ionic conductivity of the LLZO-polymer gel electrolyte, LiBOB can be incorporated as a Li salt enhancer to form binary Li salts in the composite. The preferred weight ratio of LiBOB to the polymer-gel electrolyte is around 0.4-0.6 wt %. Different weight percentages of LiBOB is added to the polymer gel ternary system, excluding the weight of LLZO. It is also important to balance the weight ratio of LiBOB while maintaining the concentration of LLZO in order to obtain the overall best ionic conductivity as well as the best performance of the resultant coin cells.

Figure 5:
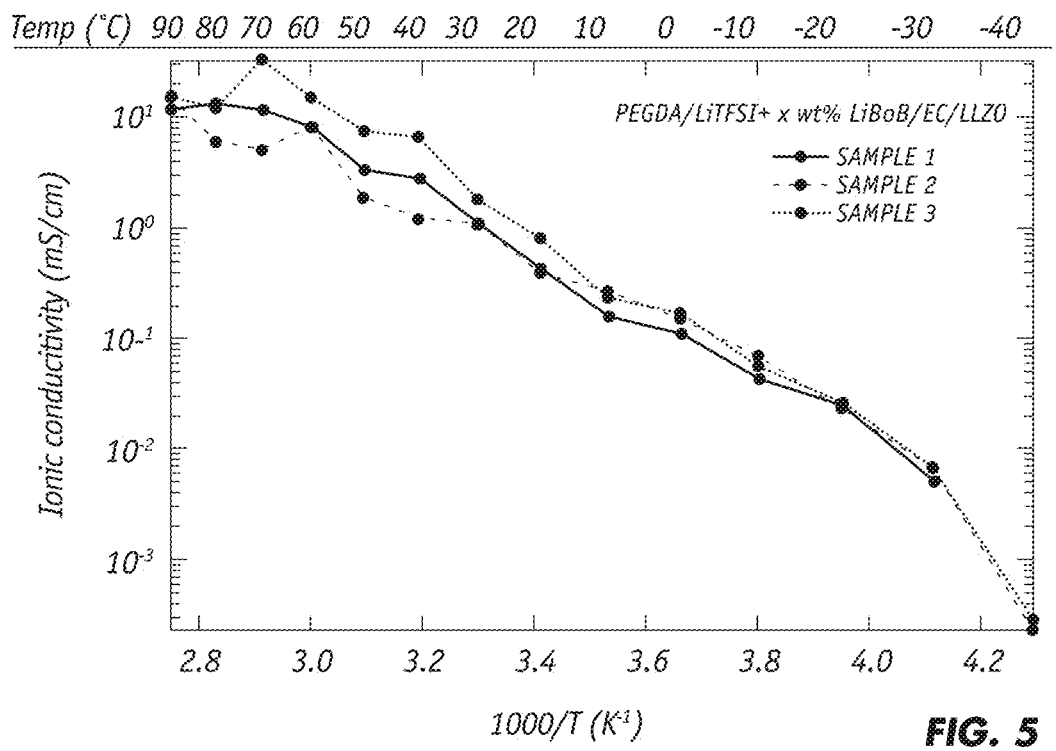
FIG. 5 is a graph of ionic conductivity vs. temperature for LLZO-polymer gel electrolytes containing LiBOB.

Free-standing solid-state electrolytes comprising approximately 12.4 wt % PEDGA polymer matrix, 33.2 wt % LiTFSI, vary amounts of LiBOB, 37.3 wt % EC plasticizer, and 16.6 wt % LLZO were fabricated. The LLZO consisted of $Al_{0.15}Li_{6.75}La_3Zr_{1.75}Ta_{0.25}O_{12}$. The amount of LiBOB in samples 1, 2 and 3 were: (i) 0 wt %, (ii) 0.3 wt %, and (iii) 0.5 wt %, respectively. The ionic conductivities of the samples were measured over a temperature window of −40° C. to 90° C. Due to the low miscibility of LiBOB salt in the composites, when the weight ratio of LiBOB to the polymer gel matrix was 1 wt %, lithium salt or LLZO particles were visible, indicating a non-uniform precursor solution. All of electrolyte layers with less than 1 wt % LiBOB showed high ionic conductivities within the entire temperature window. The ionic conductivities of three electrolyte samples are shown in FIG. 5. In the high temperature region, the ionic conductivity of the electrolytes with binary lithium salts containing 0.6 wt % LiBOB is higher than that of the electrolyte containing only LiTFSI as the single source of lithium salt. In the low temperature region, the presence of LiBOB does not seem to influence the ionic transport properties within the electrolyte layer. At a low temperature of −40° C., the ionic conductivity of the electrolyte is too low to be measured, but the electrolyte layers using binary lithium salt do present detectable ionic conductivity.

Coin cells comprising a lithium metal anode, an LFP cathode and solid-state electrolytes were fabricated. The solid-state electrolytes had the same compositions as those tested and described in FIG. 3 wherein the plasticizer consisted of SCN, EC, DMSO, GN, or PC. Each layer of LLZO-polymer gel electrolyte was formed through layer-by-layer UV polymerization. The coin cells were first initialized at a low rate to improve the electrical contact between the different layers: 0.1 C was applied to coin cells with charging up to 3.7V, and then the cell was discharged at 0.1 C down to 2.5V. Then, these coin cells were tested 5 cycles under each current level of 0.1 C, 0.2 C, 0.5 C, and 1 C, respectively.

Figure 6A:
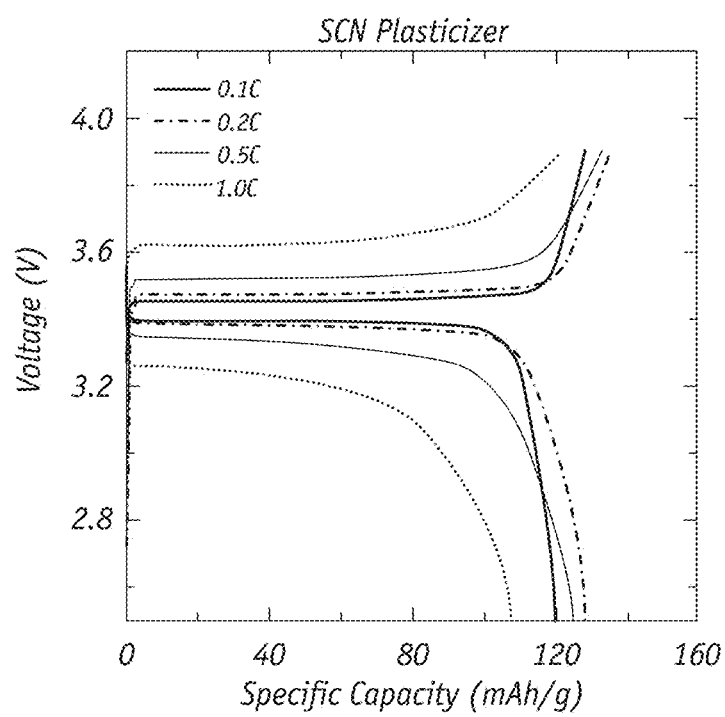
FIGS. 6A-6E are charge-discharge curves of coin cells based on LLZO-polymer gel electrolytes containing different plasticizers at cycling rates of 0.1 C, 0.2 C, 0.5 C, and 1 C.
Figure 6B:
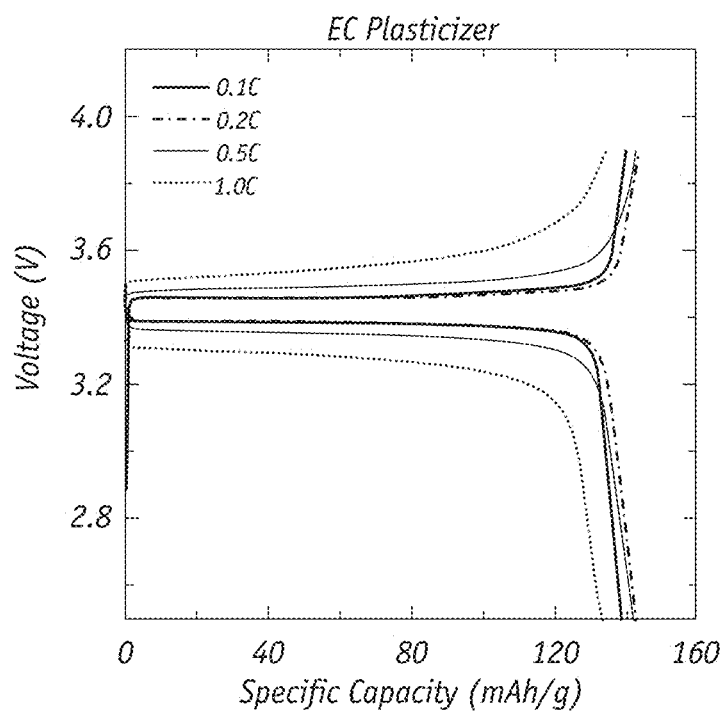
Figure 6C:
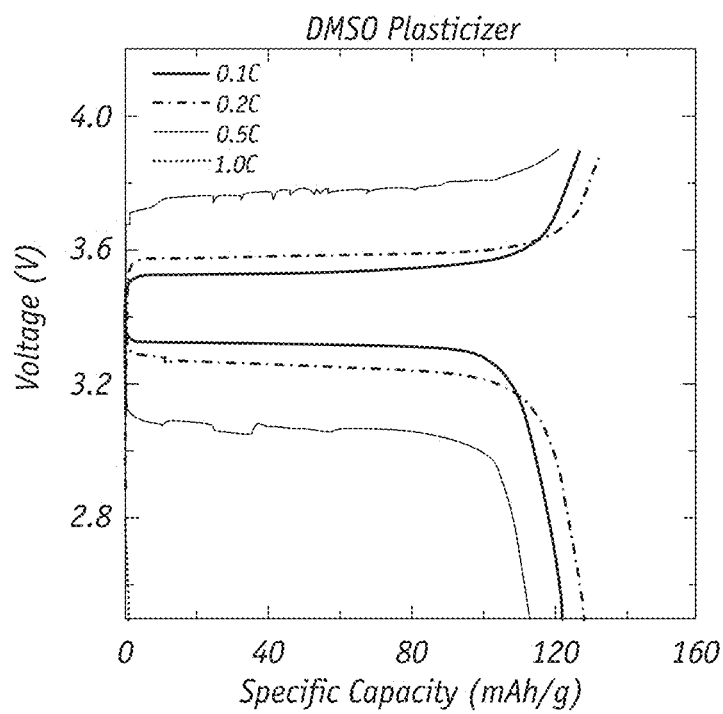
Figure 6D:
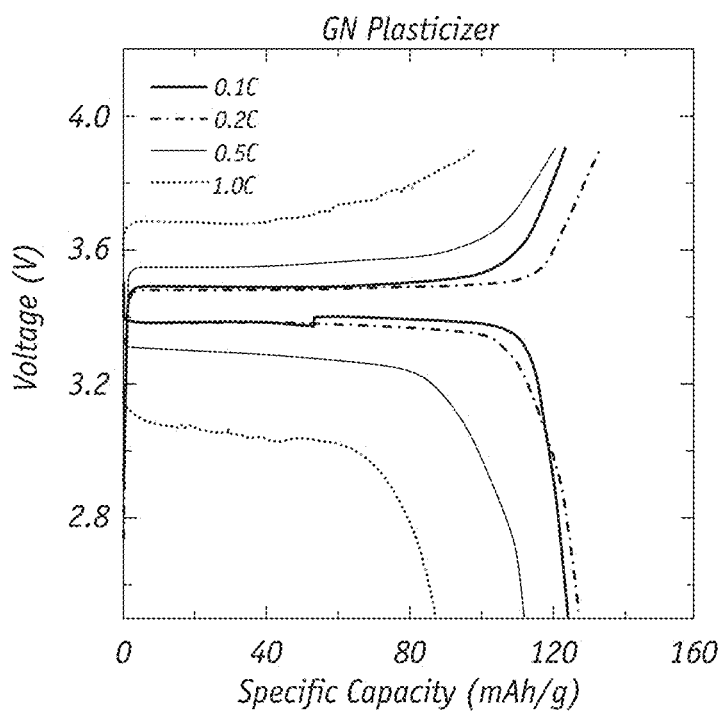
Figure 6E:
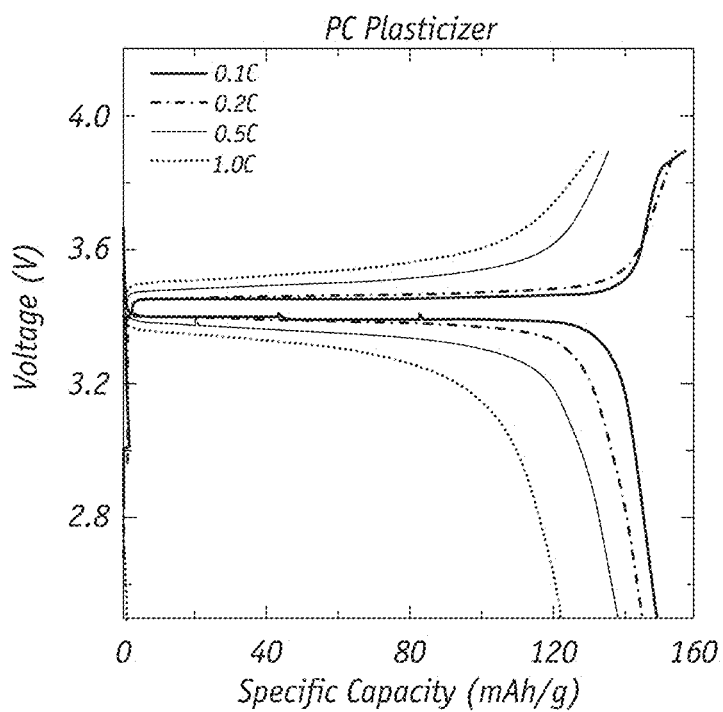

FIGS. 6A through 6E show the charge-discharge curves of the coin cells at different current levels. As shown in FIG. 6A, the coin cell with the SCN based plasticizer presented increased specific capacity from 120 mAh/g to around 130 mAh/g when the rate is enlarged from 0.1 C to 0.2 C and 0.5 C. The specific capacity also slightly decreased to ~105 mAh/g at a rate of 1.0 C, which is due to the moderate ionic conductivity of the electrolyte layer. As shown in FIG. 6B, the coin cell with the EC based plasticizer presented a high specific capacity of 140 mAh/g when the test current rates are 0.1 C, 0.2 C, and 0.5 C. Moreover, when the rate is increased to 1.0 C, only negligible reduction of specific capacity is observed, from 140 mAh/g to 133 mAh/g. These results are consistent with the results from the investigation of ionic conductivity that EC-based LLZO-polymer gel electrolyte possesses a higher ionic conductivity when compared to that based on SCN plasticizer. As shown in FIG. 6C, when DMSO is used as the plasticizer in the LLZO-polymer gel electrolyte, the coin cell exhibits a large internal resistance as the plateau regions of the charge and discharge curve are far from each other. Under low rates of 0.1 C, 0.2 C, and 0.5 C, the coin cell presents moderate specific capacity close to 120 mAh/g. However, when the coin cell is tested under 1 C, due to the low ionic conductivity, it is difficult for the ions to transport through the electrolyte layer to the counter electrode; thus, the coin cell almost loses its specific capacity. As shown in FIG. 6D, slightly reduced specific capacities are also observed from the coin cell with GN based plasticizer. The specific capacity is decreased from 120 mAh/g when tested under 0.1 C and 0.2 C to 110 mAh/g as tested under 0.5 C. It is further reduced down to 84 mAh/g, when the coin cell is tested at 1 C. Finally, as shown in FIG. 6E, coin cells with PC based plasticizer exhibited much reduced internal resistance, but the specific capacity of the coin cell is also reduced from a high value close to the theoretical capacity of 160 mAh/g down to 155 mAh/g, 141 mAh/g, and 124 mAh/g when the testing current is increased from 0.1 C to 0.2 C, 0.5 C, and 1.0 C, respectively.

The rate performance data for the coin cells is consistent with the ionic conductivity findings on the function of plasticizers in the solid-state gel electrolytes. When the electrolyte layer is very ionic conductive, the corresponding coin cell shows low internal resistance and very small reductions when they are tested under a relatively large current level of 0.5 C and 1.0 C. The rate performance data suggests that both EC and PC are good plasticizer candidates for high performance coin cells with large charge-discharge rates. Moreover, good capacities for coin cells at large rates are indicative of good cycling stabilities as fewer number of ions will be consumed during the charge-discharge process.

The interactions between the electrolyte layer and the anode and cathode materials at their interfaces influence the efficiencies of coin cells. The cycling stability of the coin cells using LLZO-polymer gel electrolyte layers with different plasticizers was investigated. The cycling stability of the coin cells was carried out at a relatively large current level of 0.5 C as it was determined that most of the coin cells were able to present high specific capacities at this current level. In addition, 0.5 C current rate is the minimum requirement for most commercial products as it takes two hours to fully charge lithium batteries.

Figure 7A:
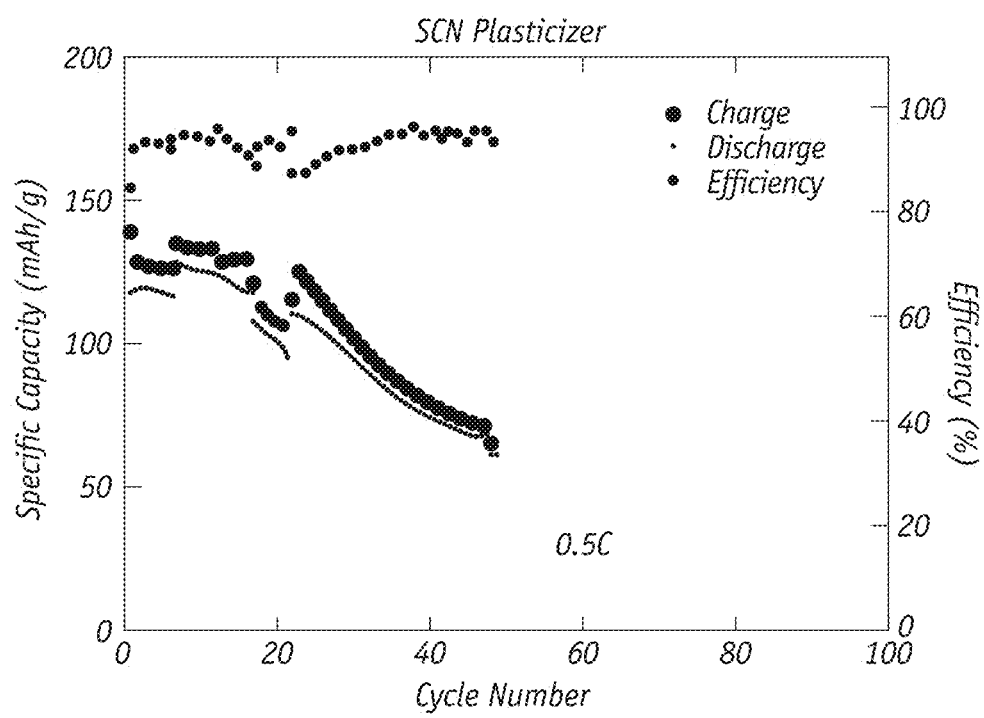
FIGS. 7A-7F are cycling performance graphs for coin cells based on LLZO-polymer gel electrolytes containing different plasticizers at cycling rates of 0.5 C.
Figure 7B:
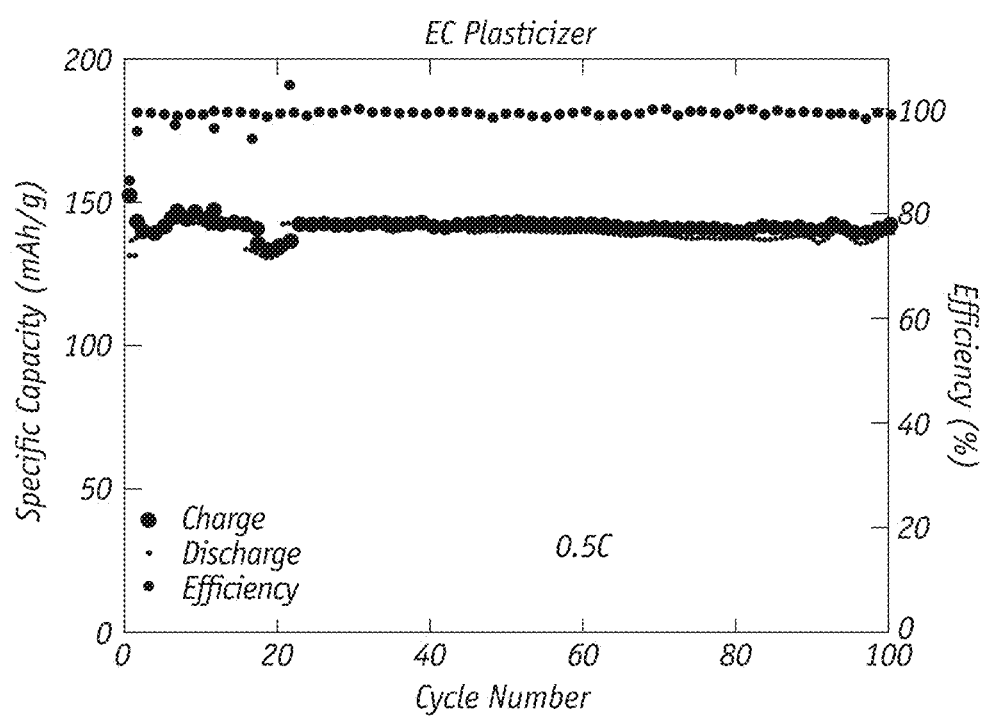
Figure 7C:
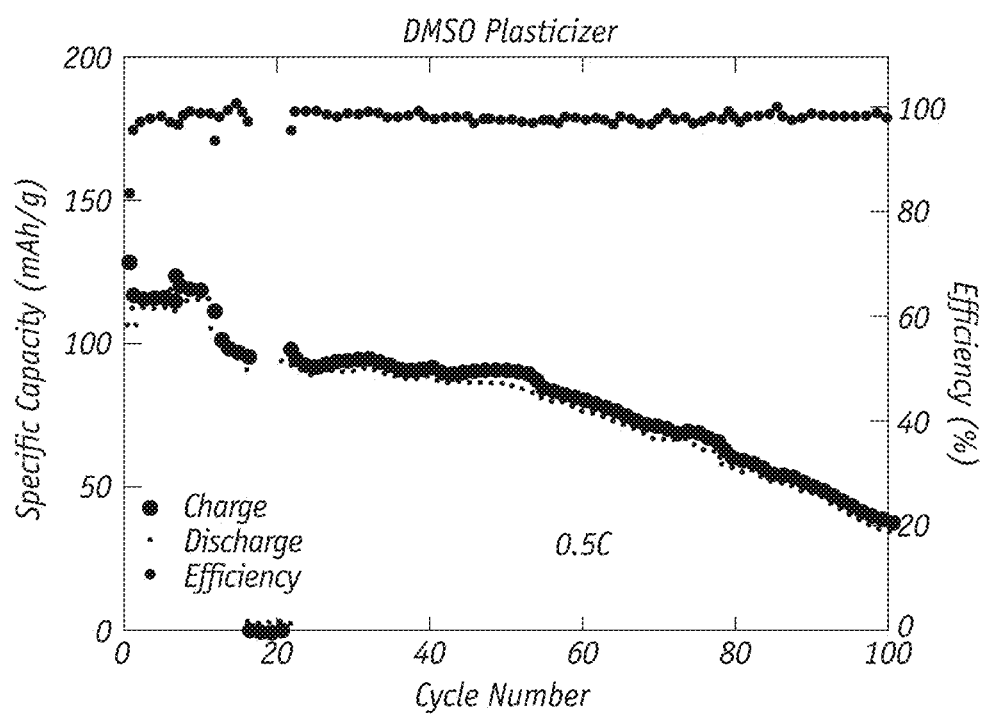
Figure 7D:
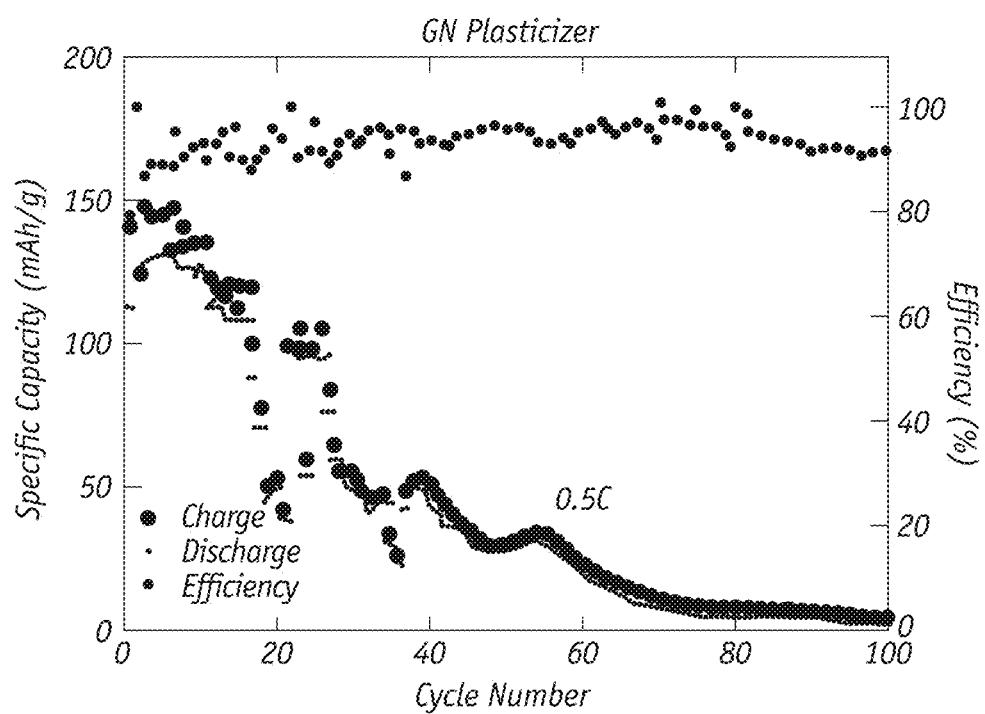

Coin cells having the same construction as those tested and described in FIGS. 6A to 6E were subject to cycling stability testing. FIGS. 7A to 7F show the specific capacities of the coin cells under charge and discharge conditions as well as the columbic efficiencies along with the cycling times at 30° C. The coin cells were characterized under 0.5 C, which is a relatively high charge/discharge current relative to currents used in reported investigations on similar cells. As shown in FIG. 7A, the coin cell with the SCN based plasticizer shows poor cycling stability. The charge and discharge specific capacities both decreased to half of their original values after only 20 cycles. As shown in FIG. 7B, the EC based plasticizer improves the cycling stability of a coin cell significantly. The trend of the specific capacities along with cycling is almost flat, indicating negligible reductions in the performance whereas the columbic efficiency of the coin cell remains close to 100%. This result further confirms that the EC plasticizer very likely increases the ionic conductivity of the electrolyte layer. As shown in FIG. 7C, the coil with the DMSO based plasticizer shows good efficiency but as previously shown in FIG. 3, DMSO-based polymer gel electrolytes exhibit low ionic conductivity at room temperature. As a corollary, Li ions are consumed during ion transport which leads to a reduction in specific capacity of the cathode and ultimately to a continued decreased in performance of coin cell along with cycling. As shown in FIG. 7D, the coil cell with the GN based plasticizer shows abrupt reductions in the charge and discharge specific capacities. This can be due to the weak mechanical strength of the polymer gel matrix since the GN molecule is strongly coordinated with the repeating units of the polymer and softens the polymer chain.

Figure 7E:
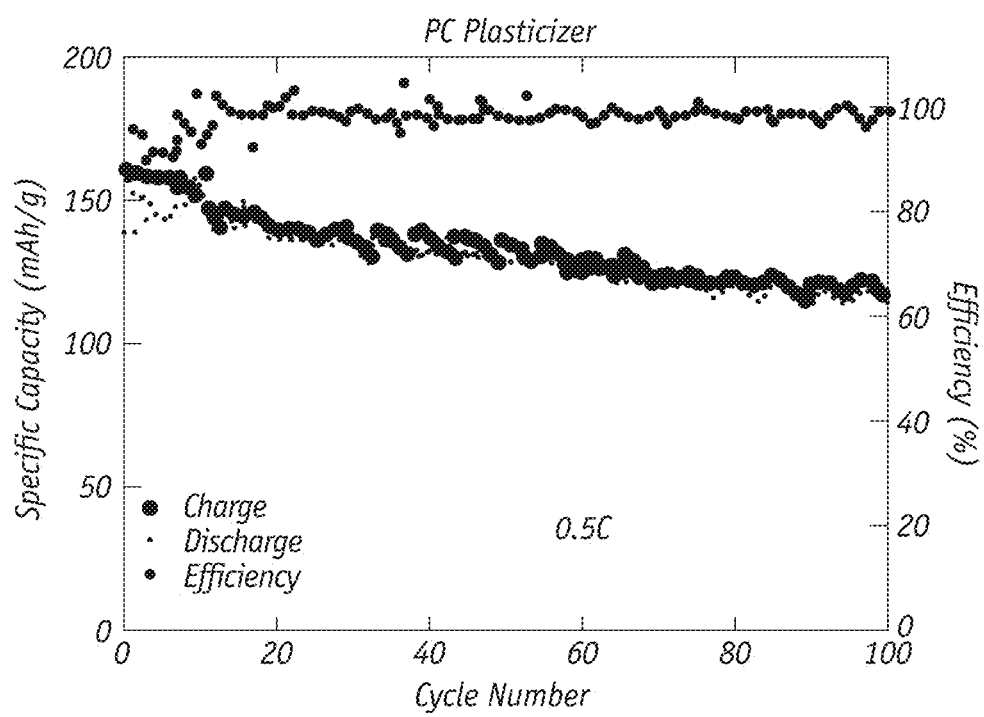
Figure 7F:
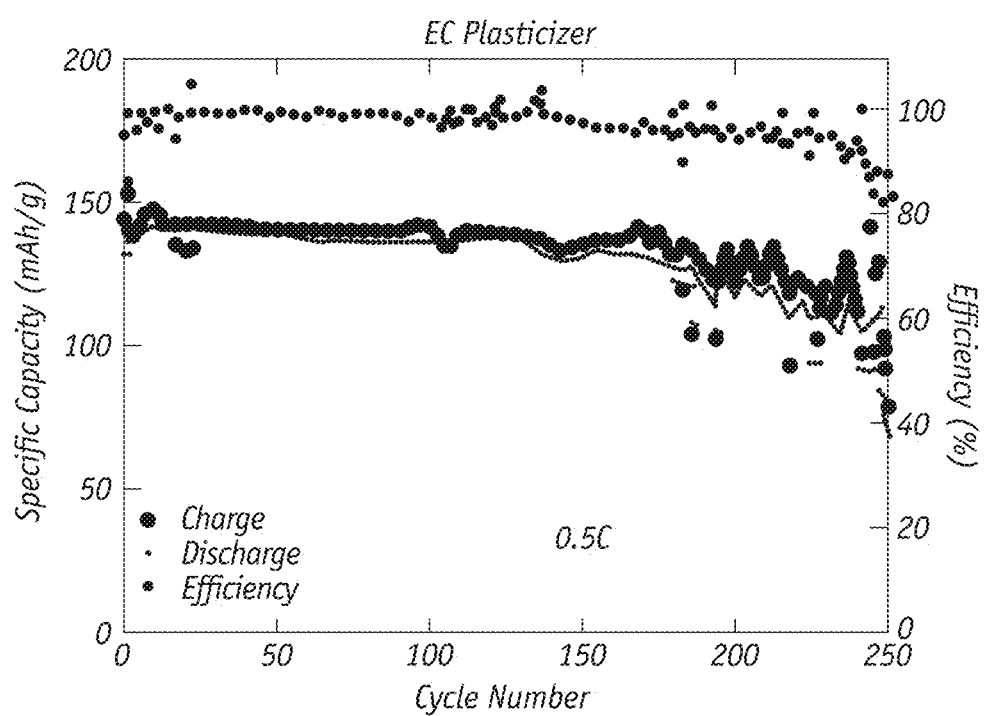

Since PC has the same functional group as EC, the mechanical strength of PC-based polymer gel electrolyte layer is essentially the same as that for EC, and as shown in FIG. 7E, the coil cell with the PC based plasticizer shows excellent cycling stability at 0.5 C. However, small variations in the cycling performance can be observed, which is due to the larger temperature dependence of the PC based polymer gel electrolyte as the temperature-controlled chamber was exposed to random door open and close for sample loading. Finally, further increasing the cycling number to 250 for the stability test on the coin cell with the EC based plasticizer, it is exhibited that the coin cell possesses 80% of its performance after more than 200 cycles, which is among the best coin cell reported with such a large rate.

The foregoing has described the principles, preferred embodiment and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A ceramic-polymer film that comprises: a polymer matrix which comprises 12.4 wt % of the film; a plasticizer which comprises 37.3 wt % of the film; a lithium salt which comprises 33.2 wt % of the film; and ceramic nanoparticles having the formula $Al_xLi_{7-x}La_3Zr_{1.75}Ta_{0.25}O_{12}$ where x ranges from greater than 0 to 0.85 (LLZO), wherein the ceramic nanoparticles have diameters that range from 100 to 2000 nm and comprise 16.6 wt % of the film, wherein the film has an ionic conductivity of higher than $1 \times 10^{-4}$ S/cm when measured at a temperature in the range of $-20°$ C. to $10°$ C. and wherein the film has an ionic conductivity of higher than $1 \times 10^{-3}$ S/cm when measured at a temperature $20°$ C. or higher.

2. The film of claim 1 wherein the plasticizer consists essentially of a mixture of EC and DMSO.

3. The film of claim 1 wherein the film is free standing and has a thickness that ranges from 100 to 900 μm.

4. The film of claim 1 wherein the film which has a first surface and a second surface and the concentration of LLZO nanoparticles in the film increases in the direction from the first surface to the second surface.

5. The film of claim 1 wherein the plasticizer consists essentially of a mixture of PC and DMSO.

6. The film of claim 1 where x ranges from 0.15 to 0.85.

7. The film of claim 6 wherein the plasticizer consists essentially of a mixture of EC and DMSO.

8. The film of claim 6 wherein the plasticizer consists essentially of a mixture of PC and DMSO.

9. The film of claim 1 where x ranges from 0.15 to 0.85.

10. An electrochemical cell which comprises: an anode; a cathode; and interposed therebetween a solid-electrolyte that is a film which comprises:
a polymeric matrix which comprises 12.4 wt % of the film;
a plasticizer which comprises 37.3 wt % of the film;
a lithium salt which comprises 33.2 wt % of the film; and
ceramic nanoparticles having the formula $Al_xLi_{7-x}La_3Zr_{1.75}Ta_{0.25}O_{12}$ where x ranges from greater than 0 to 0.85 (LLZO), and wherein the ceramic nanoparticles have diameters that range from 100 to 2000 nm and comprise 16.6 wt % of the film, wherein the film is free standing and has a thickness that ranges from 100 to 900 μm.

11. The electrochemical cell of claim 10 wherein the solid-electrolyte is a film which has a first surface and a second surface and the concentration of LLZO nanoparticles in the film increases in the direction from the first surface to the second surface.

12. The electrochemical cell of claim 10 wherein the plasticizer consists essentially of a mixture of EC and DMSO.

13. The electrochemical cell of claim 10 wherein the plasticizer consists essentially of a mixture of PC and DMSO.

14. The electrochemical cell of claim 10 where x ranges from 0.15 to 0.85.

15. The electrochemical cell of claim 14 wherein the plasticizer consists essentially of a mixture of EC and DMSO.

16. The electrochemical cell of claim 14 wherein the plasticizer consists essentially of a mixture of PC and DMSO.

17. The electrochemical cell of claim 10 where x ranges from 0.15 to 0.85.

18. A process for preparing an electrochemical cell which comprises:
(a) providing a cathode;
(b) providing an anode; and
(c) forming a solid-electrolyte between the cathode and anode wherein the solid electrolyte is a film that comprises: (i) a polymeric matrix that comprises 12.4 wt % of the film, (ii) a plasticizer that comprises 37.3 wt % of the film, (iii) a lithium salt that comprises 33.2 wt % of the film; and (iv) ceramic nanoparticles having the formula $Al_xLi_{7-x}La_3Zr_{1.75}Ta_{0.25}O_{12}$ where x ranges from 0 to 0.85 (LLZO), and wherein the ceramic nanoparticles have diameters that range from 100 to 2000 nm and comprise 16.6 wt % of the film and wherein the LLZO is synthesized by (i) mixing stoichiometric amounts of $LiOH.H_2O$, $La_2O_3$, $ZrO_2$, $Al_2O_3$ and $Ta_2O_5$ in a first liquid form a mixture, (ii) ball milling the mixture to form a slurry, (iii) drying the slurry to form a dried material, and (vi) calcining the dried material to decompose the $LiOH.H_2O$ to form an as-calcined powder, (iv) ball milling the as-calcined powder in a second liquid to form a ball-milled material, and (v) drying the ball-milled material to form dried powders and (v) sintering the dried powders at a temperature from 800 to $1150°$ C.

19. The process of claim 18 comprising calcining the dried material at a calcine temperature of 950 to $1050°$ C. to yield LLZO nanoparticles with diameters of 100 nm to 2 microns and whereby employing higher calcine temperatures yields nanoparticles with larger diameters.

20. The process of claim 18 wherein the plasticizer consists essentially of (i) EC (ii) a mixture of EC and DMSO or (iii) a mixture of PC and DMSO.

21. The process of claim 20 wherein the plasticizer consists essentially of a mixture of EC and DMSO.

22. The process of claim 20 wherein the plasticizer consists essentially of a mixture of PC and DMSO.

23. The process of claim 18 where x is greater than 0.

24. The process of claim 18 where x ranges from 0.15 to 0.85.

25. The process of claim 18 wherein the film is free standing and has a thickness that ranges from 100 to 900 μm.

26. The process of claim 18 wherein the film is formed on an electrode.

27. The process of claim 18 where x is greater than 0.

28. The process of claim 27 wherein the plasticizer consists essentially of a mixture of EC and DMSO.

29. The process of claim 27 wherein the plasticizer consists essentially of a mixture of PC and DMSO.

30. The process of claim 18 where x is 0.15 to 0.85.

31. The process of claim 30 wherein the plasticizer consists essentially of a mixture of EC and DMSO.

32. The process of claim 30 wherein the plasticizer consists essentially of a mixture of PC and DMSO.

* * * * *